United States Patent [19] [11] 4,208,492
Hedaya et al. [45] Jun. 17, 1980

[54] HIGH MOLECULAR WEIGHT CARBORANE-SILOXANE BLOCK COPOLYMERS AND METHOD FOR THEIR PREPARATION

[75] Inventors: Eddie Hedaya, White Plains, N.Y.; George T. Kwiatkowski, Greenbrook, N.J.; Edward N. Peters, Piscataway, N.J.; Donald D. Stewart, South Plainfield, N.J.

[73] Assignee: Union Carbide Corporation, New York, N.Y.

[21] Appl. No.: 865,918

[22] Filed: Dec. 30, 1977

[51] Int. Cl.$^2$ .................... C08L 85/04; C08L 83/10; C08L 79/04
[52] U.S. Cl. .................... 525/389; 525/431; 525/436; 525/446; 525/464; 525/474; 525/534; 525/540; 528/5
[58] Field of Search .................... 260/824 R, 46.5 E; 528/5; 525/389

[56] References Cited

U.S. PATENT DOCUMENTS

| | | | |
|---|---|---|---|
| 3,388,091 | 6/1968 | Heying et al. | 260/46.5 E |
| 3,536,657 | 10/1970 | Noshay et al. | 260/837 |
| 3,539,656 | 11/1970 | Noshay et al. | 260/824 |
| 3,539,657 | 11/1970 | Noshay et al. | 260/824 R |
| 3,657,385 | 4/1972 | Matzner et al. | 260/857 R |
| 3,689,455 | 9/1972 | Chapman | 260/46.5 E |

*Primary Examiner*—Wilbert J. Briggs, Sr.
*Attorney, Agent, or Firm*—William Raymond Moran

[57] ABSTRACT

Elastomeric high molecular weight alternating and random block copolymers are disclosed which comprise blocks of a soft carborane-siloxane elastomer and blocks of a high performance rigid polymer. Methods for preparing such block copolymers are also disclosed. These copolymers exhibit the advantages of high temperature elastomers while allowing the use of conventional thermoplastic fabrication techniques.

28 Claims, 3 Drawing Figures

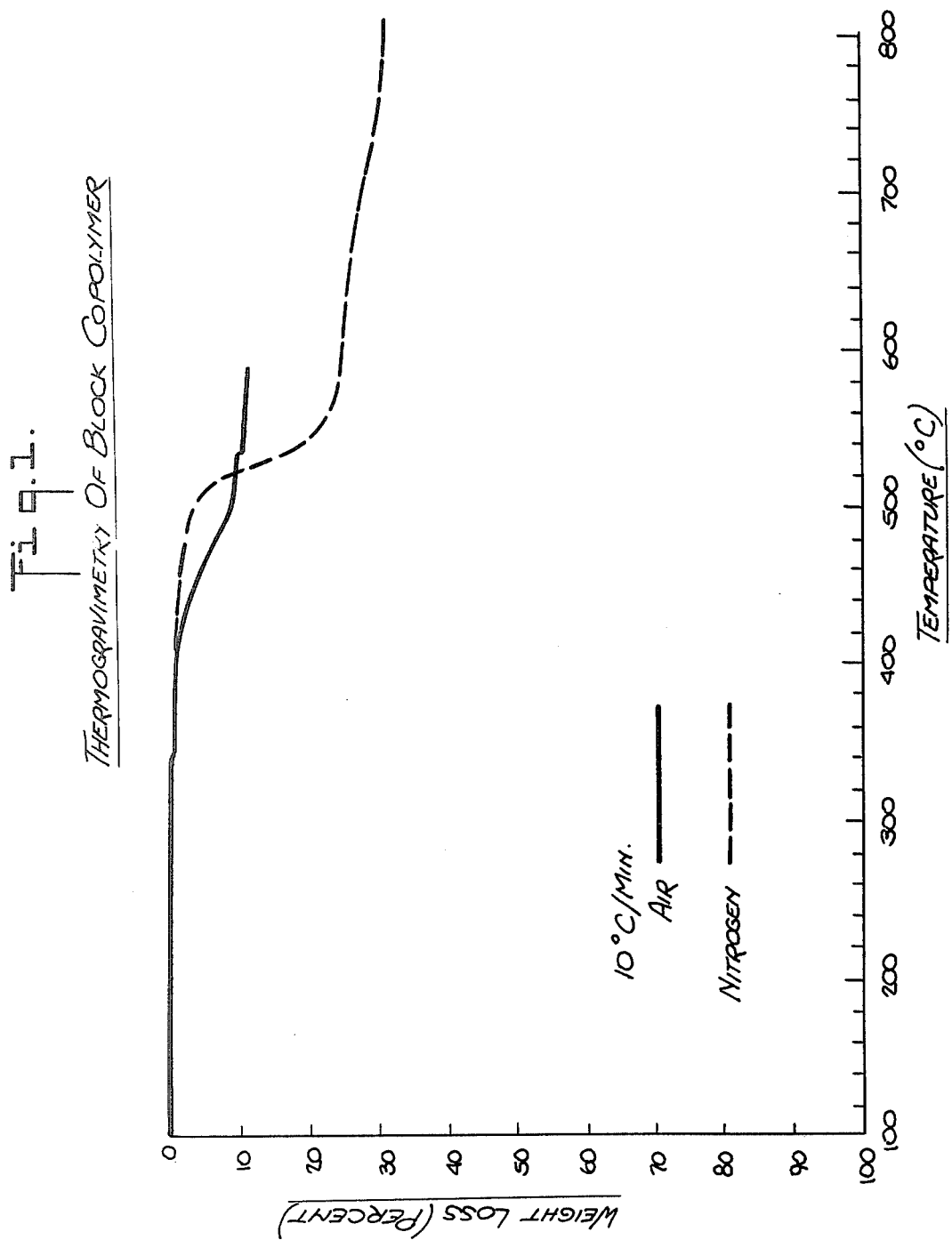

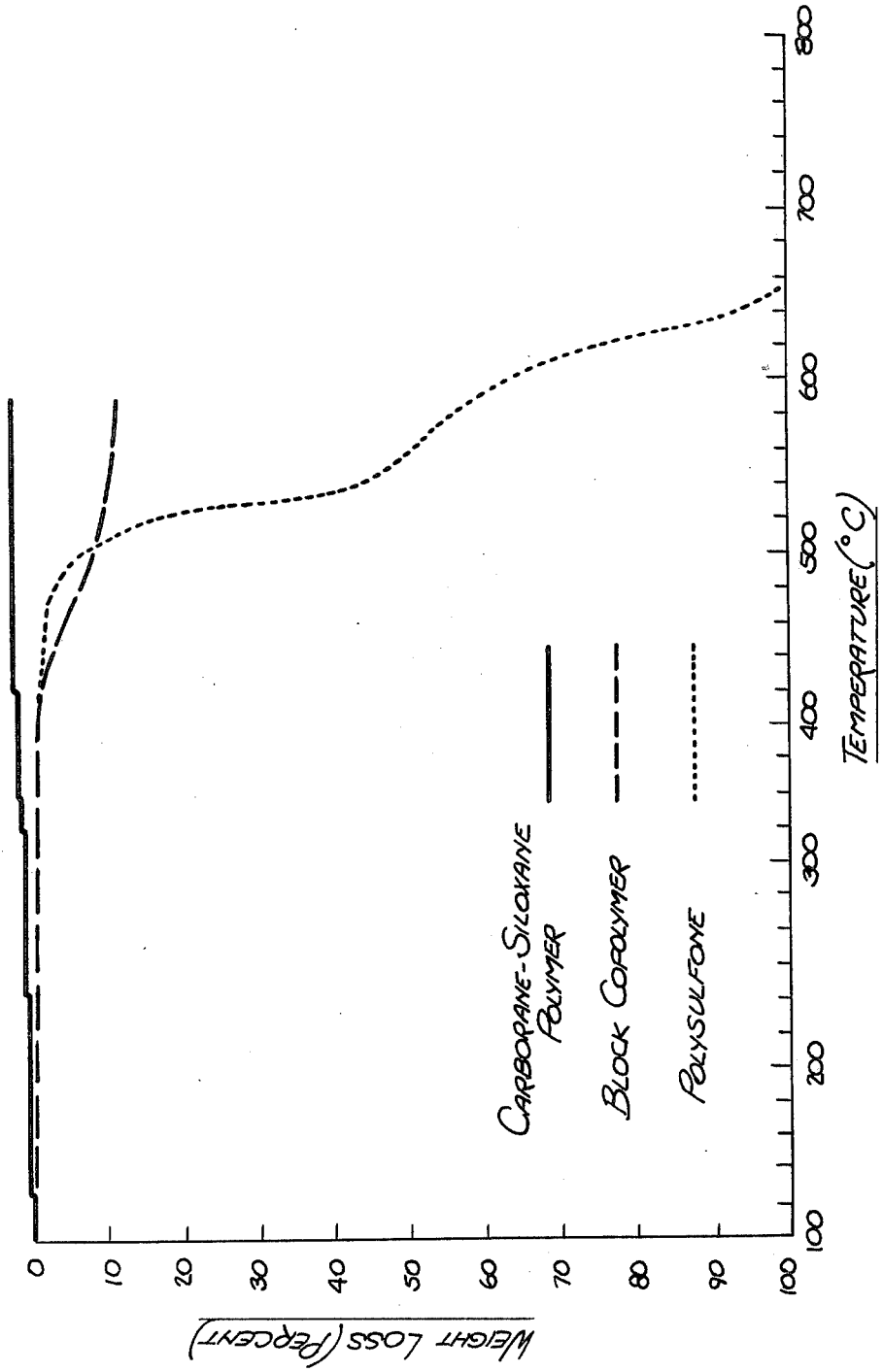

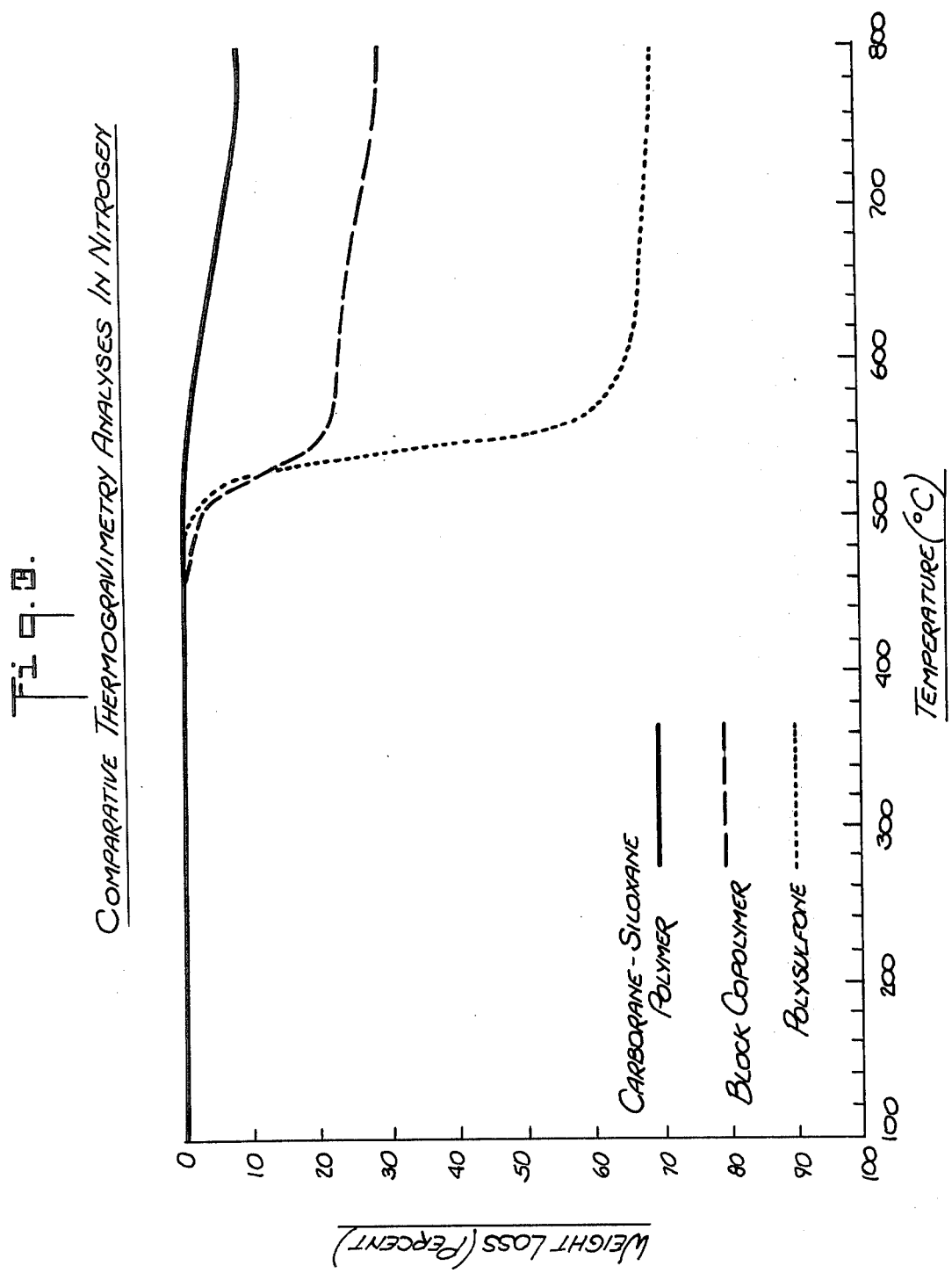

HIGH MOLECULAR WEIGHT CARBORANE-SILOXANE BLOCK COPOLYMERS AND METHOD FOR THEIR PREPARATION

BACKGROUND OF THE INVENTION

The present invention relates to high molecular weight alternating and random block copolymers and methods for their preparation; more particularly, the present invention relates to high molecular weight carborane-siloxane alternating and random block copolymers with high performance rigid materials, and methods for their preparation.

Carborane-siloxane polymers are known in the art; see, for example, an article entitled "Carboranesiloxane Polymers" by H. A. Schroeder in *Rubber Age*, February 1969 and U.S. Pat. No. 3,689,455. These polymers have excellent high temperature properties and are generally superior in this respect to the silicone and fluorocarbon rubbers. The polymers may be compounded with suitable fillers and additives and fabricated into cured elastomeric articles. The excellent high temperature properties of such elastomers make them especially useful for a wide variety of applications, such as gaskets, seals, wire and cable insulation, and the like. Linear, high molecular weight carborane-siloxane polymers and methods for their preparation are disclosed in commonly-assigned, copending U.S. patent application Ser. No. 770,509, filed Feb. 22, 1977.

High performance rigid polymers are known which exhibit excellent mechanical performance and in some cases solvent resistance. Examples of such polymers are polysulfones, polyimides, polyarylethers, aromatic and alkyl polyesters, polyphenylene sulfides, polyquinoxalenes, polybenzimidizoles, and the like. Typically, these high performance polymers are linear thermoplastic, stiff or rigid polymers characterized by high phase transition and high tensile and flexural modulus values.

Block copolymer elastomers, i.e. copolymers formed by joining two separate polymer chains of different materials which have either been previously separately polymerized or copolymerized together, are known in the art. Such block copolymer elastomers, as compared to their vulcanized counterparts, have certain advantages which include their greater versatility, the ease of processing and potential for reuse of scrap and excellent mechanical properties. For example, polyarylene polyether block copolymers with organopolysiloxanes and lactams are disclosed in U.S. Pat. Nos. 3,536,657, 3,539,665, 3,539,656, 3,539,657 and 3,657,385. Polysulfonepolydimethylsiloxane block copolymers are disclosed in an article by A. Noshay et al., *Polymer Reprints* 12, 1 (1971) 247.

Elastomeric block copolymers have now been developed which combine the elastomeric capabilities of carborane-siloxane elastomers with the mechanical performance and solvent resistance of high performance rigid materials without compromising the thermal capabilities of either system. Through the proper selection of the rigid block and the elastomeric carborane-siloxane block, copolymers are provided which possess both the advantages normally associated with thermoplastics (e.g., short fabrication cycles, reprocessability, etc.) and those normally associated with carborane-siloxane polymers (e.g., thermal stability and elastomeric behavior over a wide temperature range, etc.). The block copolymers of the invention are useful in high temperature applications as gaskets, seals, wire and cable insulation, and the like.

SUMMARY OF THE INVENTION

The block copolymers of the invention exhibit a high molecular weight and comprise soft blocks of a carborane-siloxane elastomer and hard blocks of a thermally-stable, high modulus and high phase transition ($T_g$ or $T_M$) rigid polymer. The block copolymers may either be alternating, $+A-B+_n$ or BAB, or random, $+(A')_x-B+_n$ or $+A-(B')_y+_n$, wherein A and $(A')_x$ represent a carborane-siloxane elastomeric soft block and B and $(B')_y$ represent a block of a high performance rigid polymer.

The present invention also includes processes for preparing these copolymers. The alternating block copolymers may be prepared by reacting a reactive end group-terminated oligomer of the rigid polymer B with a reactive end group-terminated oligomer of the carborane-siloxane polymer A. The random block copolymers may be prepared by forming in situ soft blocks $(A')_x$ or hard blocks $(B')_y$ in the presence of, respectively, a preformed reactive end group-terminated oligomer of a hard block B or a soft block A, wherein x and y may vary to provide soft blocks $(A')_x$ or hard blocks $(B')_y$ of varying degrees of polymerization within each repeating unit.

The oligomers used in preparing the block copolymers of the invention comprise well-characterized materials and therefore the block copolymers formed from these oligomers can be made to have a controlled high-molecular weight and other properties depending upon the relative molecular weights of their respective oligomers.

These block copolymers can be formed, and shaped, using conventional techniques, and any scrap can be reprocessed. Since they are self-reinforcing, they can exhibit superior mechanical properties compared to their counterpart vulcanized elastomers, and furthermore, they overcome one disadvantage of vulcanized elastomers caused by vulcanization; i.e., the thermally weak linkages formed by cross-linking or vulcanization.

DETAILED DESCRIPTION OF THE INVENTION

The Alternating Block Copolymers

The alternating block copolymers of the invention may be characterized as $+A-B+_n$; wherein A is a soft carborane-siloxane elastomer, B is a hard or rigid high performance material of high modulus and high phase transition temperature, and n is a positive number to provide a high molecular weight copolymer. BAB block copolymers are also possible as described below. The weight average molecular weight of the block copolymer is not particularly limited and may be on the order of from 25,000 to 20,000,000 and higher.

Generally, the higher the molecular weight the better the mechanical properties are but the more difficult it is to fabricate the copolymer. For example, very high molecular weight block copolymers may require compression molding or solution casting fabrication processes, while relatively lower molecular weight copolymers may be fabricated using simpler injection molding or extrusion processes. Therefore, depending on the properties desired and the method of fabrication, the molecular weight of the block copolymers of the invention may vary over a wide range.

The relative amounts of the soft and hard blocks in these block copolymers may vary over a wide range so long as the resulting block copolymer contains a sufficient amount of the elastomeric carborane-siloxane block to provide the copolymer with good elastomeric properties. Generally, the block copolymer of the invention should exhibit continuous performance characteristics over a wide temperature range, such as a low modulus, good tensile strength and elongation, good resilience, thermal stability, solvent resistance, etc. Typically, an excellent block copolymer of the invention will exhibit continuous performance characteristics between about −40° C. and up to and above 300° C. and will preferably exhibit elastomeric properties such as the following room temperature (25° C.) properties: a Young's Modulus of 300–7,000 psi, preferably 500–2,000 psi; a Tensile Strength of 300–5,000 psi, preferably 1,000–5,000 psi; an Elongation at Break of 50–1,500%, preferably 150–500%; a Yield Strength of 300–5,000 psi, preferably 1,000–5,000 psi; and a Yield Elongation of 50–1,500%, preferably 150–500%.

The choice of the particular hard and soft blocks, and amounts thereof, will determine the temperature characteristics of the block copolymer, and the mechanical properties may vary depending upon the block constituents of the copolymer.

The Carborane-Siloxane Block

The carborane-siloxane polymers which form the soft block A of the alternating block copolymers —A-B—$_n$ or BAB of the invention may be represented by the following formula (I):

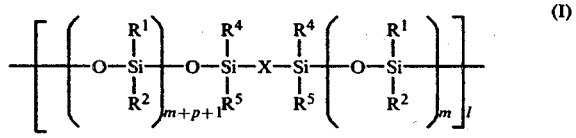

wherein $R^1$ and $R^2$, which may be the same or different, each represents hydrogen or a group containing up to 14 carbon atoms and selected from the group consisting of alkyl, alkenyl, cycloalkyl, aryl, alkaryl, aralkyl, alkoxyaryl, haloalkyl, haloaryl, cyanoalkyl, and pyridinyl; $R^4$ and $R^5$, which may be the same or different, each represents hydrogen or a group containing up to 14 carbon atoms and selected from the group consisting of alkyl, alkenyl, aryl, alkaryl, alkoxy, alkoxyalkyl, haloalkyl, haloaryl and cyanoalkyl; X represents a divalent radical derived from a carborane which may be 1,7-decacarborane, 1,12-decacarborane, 1,10-octacarborane, 1,6-octacarborane, 2,4-pentacarborane, 1,6-tetracarborane, 9-alkyl-1,7-decacarborane, 9,10-dialkyl-1,7-decacarborane, 2-alkyl-1,12-decacarborane, 2-alkyl-1,10-octacarborane, 8-alkyl-1,6-octacarborane, decachloro-1,7-decacarborane, decachloro-1,12-decacarborane, octachloro-1,10-octacarborane, decafluoro-1,7-decacarborane, decafluoro-1,12-decacarborane, octafluoro-1,10-octacarborane, or mixtures thereof; and m and p individually have a value of from 0 to 4 and l has a value depending on the desired molecular weight. The molecular weight of the soft block A is not critical and may vary over a wide range depending on the desired properties in the alternating block copolymer. Preferably, the weight average molecular weight is from 5,000 to 40,000.

The aforementioned commonly-assigned, copending U.S. Application Ser. No. 770,509, filed Feb. 22, 1977, discloses several preferred methods for the preparation of linear, high molecular weight polymers of the type of formula (I). Specifically, linear carborane-siloxane polymers may be formed by the condensation of silyl diamines or α,ω-diaminosiloxanes with carborane disilanols. In a second embodiment, such linear polymers are also prepared by the condensation of ureido-silanes or α,ω-ureido-siloxanes with carborane disilanols. In a further embodiment, carborane disilanols can be condensed with silyl bis-carbamates or α,ω-carbamoylsiloxanes to form such carborane-siloxane polymers.

In a first embodiment, the process may comprise the steps of contacting disubstituted silyl amines or α,ω-diaminosiloxanes, represented by formula (II) with carborane disilanols, represented by formula (III), to provide such linear carborane-siloxane polymers (I):

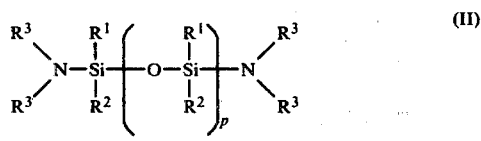

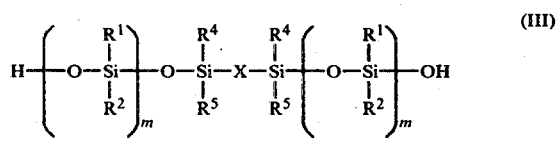

wherein $R^1$, $R^2$, $R^4$, $R^5$, X, m and p are as defined above; and wherein $R^3$ represents hydrogen, or groups containing up to 14 carbon atoms and selected from the group consisting of alkyl, alkenyl, cycloalkyl, aryl, alkaryl, aralkyl, alkoxyaryl, haloaryl, cyanoalkyl, and pyridinyl; and wherein $2R^3$s, can when taken together contain up to 6 carbon atoms and represent alkylene, dialkylene amine, alkyl-substituted dialkylene amines or dialkylene ethers.

Illustrative of all of the R groups as hereinbefore defined are such groups as methyl, ethyl, n-propyl, n-butyl, n-pentyl, n-hexyl, n-butenyl, n-hexenyl, cyclopentyl, cyclohexyl, phenyl, benzyl, o-, m-, or p-chlorophenyl, o-, m- or p-methylphenyl, o-, m-, or p-methoxyphenyl, 3,3,3-trifluoropropyl, cyanomethyl, morpholinyl, pyridinyl and the like. The R groups need not be the same in any one polymeric chain. Particularly preferred are groups containing up to 7 carbon atoms.

Illustrative of a specific condensation reaction employing a silyl diamine is the reaction of carborane disilanol (IV) $B_{10}H_{10}C_2$ $(SiMe_2OH)_2$, where Me is methyl and silyl diamine (V) $SiMe_2$ $(Me_2N)_2$:

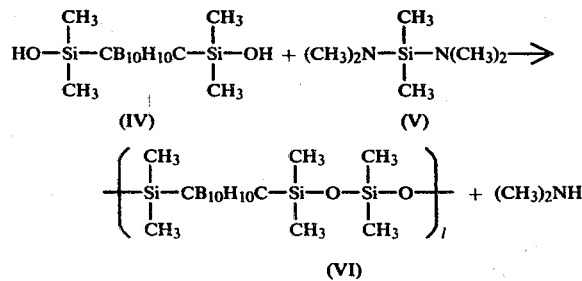

to provide the carborane-siloxane polymer (VI) wherein l has the same value as previously indicated.

As indicated, previously, and as is evident from the aforementioned equation, a wide variety of carborane disilanols can be employed in the preparation of these carborane-siloxane polymers. Illustrative disilanols include, among others, bis(hydroxydimethylsilyl)-m-carborane, bis(hydroxydimethylsilyl)-p-decacarborane, bis(hydroxydiethylsilyl)-m-decacarborane, bis(hydroxydiethylsilyl)-p-decacarborane, bis(hydroxydipropylsilyl)-m-decacarborane, bis(hydroxydipropylsilyl)-p-decacarborane, bis(hydroxydibutylsilyl)-m-decacarborane, bis(hydroxydibutylsilyl)-p-decacarborane, bis(hydroxydipentylsilyl)-m-decacarborane, bis(hydroxydipentylsilyl)-p-decacarborane, bis(hydroxydiphenylsilyl)-p-decacarborane, bis(hydroxydiphenylsilyl)-m-decacarborane, bis(hydroxydichlorodiphenylsilyl)-m-decacarborane, bis(hydroxydichlorodiphenylsilyl)-p-decacarborane and the like.

Illustrative bis silyl amines include, among others, bis(amino)silane, bis(amino)methylsilane, bis-(N-methylamino)methylsilane, bis(N,N-dimethylamino)methylsilane, bis(N,N-dimethylamino)dimethylsilane, bis(N,N-dimethylamino-N',N'-diethylamino)dimethylsilane, bis(N-isopropylamino)methylsilane, bis(N,N-diisopropylamino)methylsilane, bis(N,N-diethylamino)methylsilane, bis(N,N-dimethylamino-N'-methyl-N'-ethylamino)dimethylsilane, bis(N-isopropylamino-N'-ethylamino)dimethylsilane, bis(N-allylamino-N'-methylamino)dimethylsilane, bis(N,N-diallylamino)dimethylsilane, bis(N,N-dimethylamino)methylvinylsilane, bis(N,N-diethylamino)ethylvinylsilane, bis(N,N-dimethylamino)phenylsilane, bis(N,N-dimethylamino)methoxysilane, bis-(N,N-diethylamino)dimethoxysilane, bis(N-isopropylamino-N-allylamino)ethoxysilane, bis(N,N-dibutylamino)dimethylsilane, bis(N,N-dipentylamino)dimethylsilane, bis(N,N-diphenylamino)dimethylsilane, bis(N,N-methylamino)diphenylsilane, and the like.

In a second embodiment, the process may comprise the steps of contacting disubstituted ureido-silanes or α,ω-ureido-siloxanes, represented by formula (VII) and carborane disilanols, represented by formula (III) above, to provide such linear carborane-siloxane polymers (I):

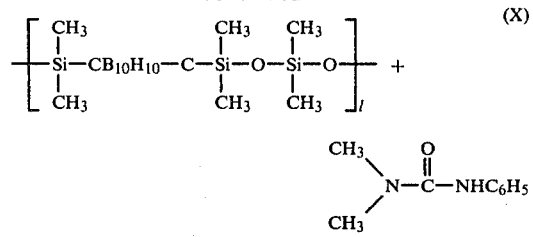

wherein $R^1$, $R^2$, $R^3$ and p are as previously indicated.

A specific illustration of this second embodiment is the condensation reaction involving meta-carborane disilanol (VIII) and a ureido-silane (IX) to give the carborane-siloxane polymer (X):

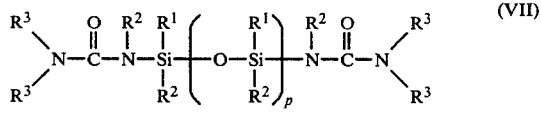

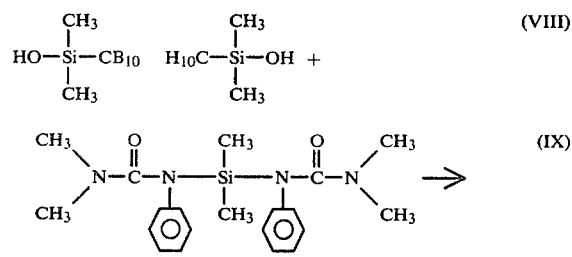

wherein l has the same values as previously indicated.

It has been observed that the use of ureido-silanes in place of silyl amines results in a polymeric product having a higher molecular weight. When carborane disilanol is condensed with silyl diamine, dimethylamine is evolved. The evolved amine in some instances can cleave the carbon-silicone bond on the carborane disilanol to produce a polymer chain terminator. This prevents the formation of a high molecular weight polymer. In contrast, the by-product of the ureido-silanes is believed to be a less nucleophilic urea, which does not interfere with the formation of a high molecular weight product.

The reaction between ureido-silane and carborane disilanol is effected under relatively mild conditions and provides the polymer in excellent yields. In practice, the carborane-disilanol is merely reacted with the ureido-silane at room temperature or lower in an inert atmosphere and stirred as the condensation reaction progresses.

As indicated above, the reaction is conducted in an inert atmosphere such as nitrogen and at atmospheric pressure. If desired the reaction can be conducted in an inert solvent such as chlorobenzene or ethylene glycol dimethyl ether. In general, temperatures of from about $-20°$ C. to about $200°$ C., and more preferably from about $-10°$ C. to about $35°$ C. provide satisfactory results when a solvent is employed.

The silanol-ureido-silane polymerization described above results in a linear and soluble carborane-siloxane polymer with melting points of 68° C. and 90° C. as determined by Differential Scanning Calorimetry (DSC). The linear nature of these polymer gum stocks is demonstrated by their solubility in solvents such as methylene chloride, chlorobenzene and tetrahydrofuran and by results from gel permeation chromatography analysis. The proton magnetic resonance (pmr) indicated only two distinct CH$_3$-Si resonances (6 cps apart) with a ratio of 2/1 which corresponds to the expected structure.

A variety of ureido-silanes and α,ω ureido-siloxanes can also be employed in the above processes for the preparation of high molecular weight carborane-siloxane polymers. For example, the ureido-silane and α,ω ureido-siloxanes can be characterized by the following generic formula (XI):

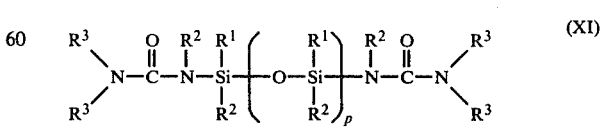

wherein $R^1$-$R^3$ and p are as previously indicated.

Illustrative ureido-silanes include, among others, bis(ureido)silane, bis(N,N'-dimethylureido)methylsilane, bis(N,N-dimethyl-N'-methylureido)silane, bis(N,N-dimethyl-N'-methylureido)methylsilane, bis(N,N'- dimethylureido)dimethylsilane, bis(N,N'-diethylureido)-methylsilane, bis(N-methyl-N'-ethylureido)methylsilane, bis(N,N-dimethyl-N'-methylureido)dimethyl-silane, bis(N,N'-diisopropylureido)methylsilane, bis(N-diisopropyl-N'-methylureido)methylsilane, bis(N,N'-diallylureido)-dimethylsilane, bis(N-allyl-N'-methylureido)dimethylsilane, bis(N,-N'-dimethylureido)vinylsilane, bis(N,N'-diethylureido)-methylvinylsilane, bis(N,N-dipropylureido)ethylvinylsilane, bis(N,N'-dimethylureido)diphenylsilane, bis(N,N-dimethylureido)methylphenylsilane, bis(N-pentylureido)-dimethylsilane, and the like.

In general, the ureido-silanes and $\alpha,\omega$ ureido-siloxanes can be prepared by a variety of methods known in the art. For example, the reaction of silyl amine with phenyl isocyanate in ether provides the ureido-silane in accordance with the following equation:

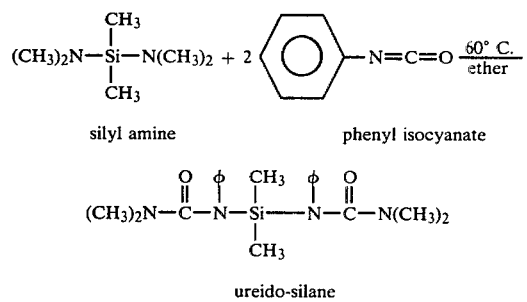

silyl amine    phenyl isocyanate

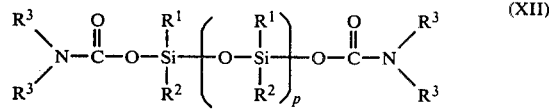

ureido-silane where $\phi$ is phenyl.

In a further embodiment for preparing carborane-siloxane polymers (I), a silyl dicarbamate or $\alpha,\omega$-dicarbamoyl-siloxanes, represented by formula (XII), is condensed with the carborane disilanols of formula (III) to provide linear carborane-siloxane polymers (I):

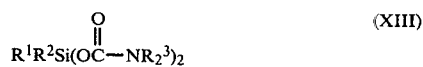

wherein $R^1$-$R^3$ and p are as previously indicated.

As in the case for the silyl urea and silyl amines a wide variety of silyl carbamates can be employed in this process. In general the silyl carbamates can be represented by the following generic formula (XIII):

$$R^1R^2Si(OC\!\!-\!\!NR_2{}^3)_2 \quad (XIII)$$
$$\phantom{R^1R^2Si(}\overset{O}{\underset{\|}{}}$$

wherein $R^1$-$R^3$ are as previously indicated. Illustrative silyl dicarbamates include, among others, bis(dimethylcarbamoyl)dimethylsilane, bis(diethylcarbamoyl)dimethylsiloxane, bis(diethylcarbamoyl)diethylsilane, bis(dipropylcarbamoyl)dimethylsilane, bis(dipropylcarbamoyl)diethylsilane, bis(dibutylcarbamoyl)dimethylsilane, bis(N-methyl-N'-ethylcarbamoyl)dimethylsilane, bis(diethylcarbamoyl)vinylsilane, bis(dimethylcarbamoyl)methylvinylsilane, bis(dimethylcarbamoyl)-dimethoxysilane, bis(diphenylcarbamoyl)dimethylsilane, bis(dimethylcarbamoyl)diphenylsilane, bis(dipentylcarbamoyl)dimethylsilane, bis(dibutylcarbamoyl)diethylsilane, bis(N,N-diethyl-N',N'-dimethylcarbamoyl)dimethylsilane, and the like.

Carborane-siloxane polymers containing higher weight portions of dimethylsiloxane moieties can also be prepared in accordance with the above process. Thus, condensation of meta-decacarborane disilanol with $Me_2N$ $(Me_2SiO)_4$ $Me_2Si$ $NMe_2$ (wherein Me=methyl) under the usual reaction conditions will afford a gumstock with the following repeating unit (XIV):

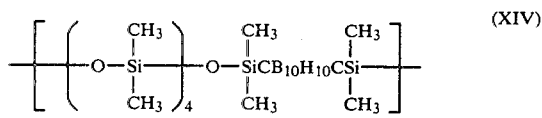

This illustrates the general extension of the disclosed technology to the synthesis of the class of polymers represented by formula (XV), wherein q has values of from 1-13, with 1-4 being preferred.

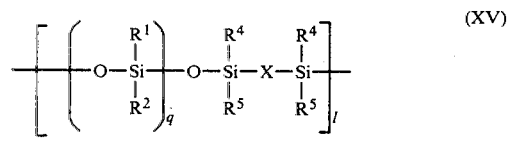

wherein $R^1$, $R^2$, $R^4$, $R^5$, X and l are as previously indicated.

The Hard Polymer Block

The polymer forming the hard block B of the alternating block copolymer $\{A\text{-}B\}_n$ of the invention may be any one of a variety of high performance rigid polymers which have a high $T_m$ or $T_g$, excellent thermal stability and high modulus and which are incompatible with the elastomeric carborane-siloxane polymer forming the soft block A. Typically, these polymers have a modulus above 200,000 psi, a phase transition temperature ($T_m$ or $T_g$) above 150° C., an elongation at break of less than 500%, preferably less than 150% and a tensile strength of at least 5,000 psi.

Glass transition temperature ($T_g$), commonly referred to as the second order phase transition temperature, refers to the inflection temperatures found by plotting the resilience (recovery from one percent elongation) of a film ranging in thickness from 3 to 15 mils against the temperature. See Brown, Textile Research Journal, 25, 891 (1955). $T_m$ is the melting point of a material and is determined by conventional methods.

The molecular weight of the hard block B is not particularly critical and will vary depending on the desired molecular weight of the resulting block copolymer, the particular polymer forming the hard block, and other factors. Preferably, the number average molecular weight of the hard block is from 2,000 to 10,000.

Examples of suitable polymers which possess the requisite properties as outlines above include polysulfones, polyimides, polyarylethers, polycarbonates, aromatic and alkyl polyesters, polyphenylene sulfides, polyquinoxalenes, polybenzimidizoles, and like polymers. These and similar rigid high performance polymers of similar properties are known in the art and they can be prepared by conventional techniques.

An example of a suitable polysulfone is a polymer having a $T_m$ of 310° C. and represented by the following formula (XVI) prepared from hydroquinone and dichlorodiphenylsulfone:

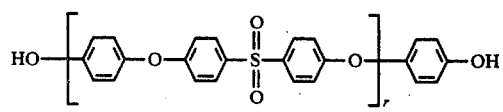
(XVI)

where r is 2–100, preferably 10–30.

A suitable polyimide is a polymer having a $T_g$ of 345° C. and represented by the following formula (XVII) prepared from oxydianiline, p-aminophenol and pyromellitic dianhydride:

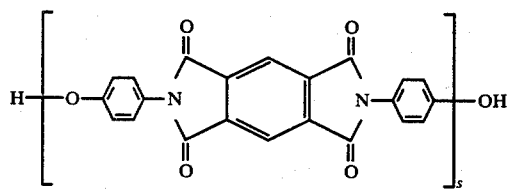
(XVII)

where s is 2–100, preferably 5–25.

A suitable polycarbonate is a polycarbonate of 2,2,4,4-tetramethyl cyclobutane-1,3-diol having a $T_g$ of 135° C. and a number average molecular weight of about 5,000.

The aromatic polyester may be, for example, a bisphenol A terephthalate having a $T_g$ of about 215° C. and a number average molecular weight of about 5,000.

The polyarylether (or polyarylene polyether) may be any one of a variety of linear thermoplastic polymers composed of a chain of recurring units of the following formula (XVIII):

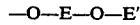
—O—E—O—E'        (XVIII)

wherein E is the residuum of a dihydric phenol and E' is the residuum of a benzenoid compound having an inert electron withdrawing group ortho or para to the valence bonds, both of said residua being valently bonded to the ether oxygens through aromatic carbon atoms. These polymers and their preparation are known and are described in, for example, U.S. Pat. No. 3,539,656, the disclosure of which is expressly incorporated herein by reference.

The residua, E and E' in formula (XVIII) are characterized as stated above since they are conveniently prepared by the reaction of an alkali metal double salt of a dihydric phenol and a dihalobenzoid compound, or by reaction of an alkali metal monosalt of a phenolic halobenzoid compound, having an electron withdrawing group as is described more fully herein.

The residuum E of the dihydric phenol can be, for instance, a mononuclear phenylene group as results from hydroquinone and resorcinol, or it may be a di- or polynuclear residuum. The residuum E can also be substituted with other inert nuclear substituents such as halogen, alkyl, alkoxy and like inert substituents.

It is preferred that the dihydric phenol be a weakly acidic dinuclear phenol such as, for example, the dihydroxy diphenyl alkanes or the nuclear halogenated derivatives thereof, which are commonly known as "bis-phenols." Such dinuclear phenols can be characterized as having the structure represented by the following formula (XIX):

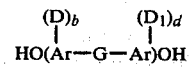
(XIX)

HO(Ar—G—Ar)OH wherein Ar is an aromatic group and preferably is a phenylene group, D and $D_1$ can be the same or different inert substituent groups as alkyl groups having from 1 to 4 carbon atoms, halogen atoms, i.e. fluorine, chlorine, bromine, or iodine, or alkoxy radicals having from 1 to 4 carbon atoms, b and d are integers having a value of from 0 to 4, inclusive, and G is representative of a bond between aromatic carbon atoms as in dihydroxydiphenyl, or is a divalent radical, including for example, inorganic radicals as —CO—, —O—, —S—, —S—S—, —SO$_2$—, and divalent organic hydrocarbon radicals such as alkylene, alkylidene, cycloaliphatic, or the halogen, alkyl, aryl or like substituted alkylene, alkylidene and cycloaliphatic radicals as well as alkalicyclic, alkarylene and aromatic radicals and a ring fused to both Ar groups.

Examples of specific dihydric polynuclear phenols include among others: the bis-(hydroxyphenyl)alkanes such as 2,2-bis(4-hydroxyphenyl)propane, bis-(4-hydroxy-2,6-dimethyl-3-methoxyphenyl)methane, 1,1-bis(4-hydroxyphenyl)ethane, 1,1-bis-(3-methyl-4-hydroxyphenyl)propane, 2,2-bis-(4-hydroxyphenyl)pentane, 2,2-bis-(4-hydroxyphenyl)heptane, bis-(4-hydroxyphenyl)phenylmethane, 2,2-bis-(4-hydroxyphenyl)-1-phenylpropane, 2,2-bis-(4-hydroxyphenyl)-1,1,1,3,3,3-hexafluoropropane and the like;

Di(hydroxyphenyl)sulfones such as bis-(4-hydroxyphenyl)sulfone, 2,4'-dihydroxydiphenyl sulfone, 5'-chloro-2,4'-dihydroxydiphenyl sulfone, and the like;

Di(hydroxyphenyl)ethers such as bis-(4-hydroxyphenyl)ether, the 4,3'-, 4,2'-, 2,2'-, 2,3'-dihydroxydiphenyl ethers, 4,4'-dihydroxy-2,6-dimethyldiphenyl ether, bis-(4-hydroxy-3-isobutylphenyl)ether, bis-(4-hydroxy-3-chlorophenyl)ether, bis-(4-hydroxynaphthyl)ether, bis-(4-hydroxy-3-chloronaphthyl)ether, 4,4'-dihydroxy-3,6-dimethoxydiphenyl ether, and like materials.

Other specific examples of suitable dinuclear phenols are described in said U.S. Pat. No. 3,539,656.

It is also contemplated to use a mixture of two or more different dihydric phenols to accomplish the same ends as above. Thus when referred to above the E residuum in the polymer structure can actually be the same or different aromatic residua.

As used herein, the E term defined as being the "residuum of the dihydric phenol" refers to the residue of the dihydric phenol after the removal of the two aromatic hydroxyl groups. Thus, it is readily seen that polyarylene polyethers contain recurring groups of the residuum of the dihydric phenol and the residuum of the benzenoid compound bonded through aromatic ether oxygen atoms.

The residuum E' of the benzenoid compound can be from any dihalobenzenoic compound or mixtures of dihalobenzenoid compounds which compound or compounds have the two halogens bonded to benzene rings having an electron withdrawing group in at least one of the positions ortho and para to the halogen group. The dihalobenzenoid compound can be either mononuclear where the halogens are attached to the same benzenoid ring or polynuclear where they are attached to different benzenoid rings, as long as there is the activating electron withdrawing group in the ortho or para position of that benzenoid nucleus.

Any of the halogens may be the reactive halogen substituents on the benzenoid compounds, fluorine and chlorine substituted benzenoid reactants being preferred.

Any electron withdrawing group can be employed as the activator group in the dihalobenzenoid compounds. Preferred are the strong activating groups such as the sulfone groups (—SO$_2$—) bonding two halogen substituted benzenoid nuclei as in the 4,4'-dichlorodiphenyl sulfone and 4,4'-difluorodiphenyl sulfone, although such other strong withdrawing groups hereinafter mentioned can also be used with ease. It is further preferred that the ring contain no electron supplying groups on the same benzenoid nucleus as the halogen; however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth by J. F. Bunnett in Chem. Rev., 49, 273 (1951) and Quart. Rev., 12, 1 (1958).

The electron withdrawing group of the dihalobenzenoid compound can function either through the resonance of the aromatic ring, as indicated by those groups having a high sigma* value, i.e. above about +0.7 or by induction as in perfluoro compounds and like electron sinks.

Preferably, the activating group should have a high sigma* value, preferably above 1.0, although sufficient activity is evidenced in those groups having a sigma* value above 0.7. Preferred types of activating groups are set forth in said U.S. Pat. No. 3,539,656.

If desired, the polymers may be made with mixtures of two or more dihalobenzenoid compounds each of which has this structure, and which may have different electron withdrawing groups. Thus, the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atoms on the benzenoid nucleus.

From the foregoing, it is evident that preferred linear thermoplastic polyarylene polyethers are comprised of those wherein E is the residuum of a dinuclear dihydric phenol and E' is the residuum of a dinuclear benzenoid compound. These preferred polymers then are composed of recurring units having the formula (XX):

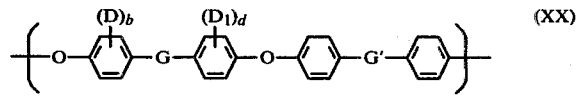

(XX)

wherein G represents a member of the group consisting of a bond between aromatic carbon atoms and a divalent connecting radical and G' represents a member of the group consisting of sulfone, carbonyl, vinyl, sulfoxide, azo, saturated fluorocarbon, organic phosphine oxide and ethylidene groups and D and D$_1$ each represent inert substituent groups selected from the group consisting of halogen, alkyl groups having from 1 to 4 carbon atoms and where b and d are integers having a value from 0 to 4 inclusive. Even more preferred are the thermoplastic polyarylene polyethers of the above formula wherein b and d are zero, G is the divalent connecting radical

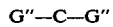

wherein G" represents a member of the group consisting of hydrogen, lower alkyl, lower aryl, and the halogen substituted groups thereof, and G' is a sulfone group.

Process For Preparing The Alternating Block Copolymers

The alternating block copolymers [—A—B—]$_n$ of the invention may be prepared by a process which comprises reacting a bis-reactive end-group terminated carborane-siloxane oligomer with a corresponding bis-reactive end group-terminated oligomer of the rigid polymer. The reactive end groups may be hydroxy-containing groups such as phenolic or silanol (i.e. SiOH) end groups, and derivatives thereof, for example ethers, esters, siloxanes, silyl esters, and the like. They may also be silyl amine, ureido silane and the like.

The reaction between the oligomers is effected under relatively mild conditions. In practice, the bis-end-functional oligomer of the rigid polymer may be merely added to the bis-end-functional oligomer of the carborane-siloxane at room temperature in an inert atmosphere and stirred as the condensation reaction progresses. In some instances it may be desirable to promote the reaction by the application of heat.

As indicated above, the reaction is conducted in an inert atmosphere such as nitrogen and at atmospheric pressure. If desired the reaction can be conducted in an inert solvent such as chlorobenzene, toluene, benzene, dimethylacetamide, methylene chloride, N-methylpyrrolidone, etc. In general, temperatures of from about −20° C. to about 200° C., and more preferably from about 10° C. to about 35° C. provide satisfactory results when a solvent is employed.

The bis-reactive end group-terminated carboranesiloxane oligomers may be prepared using the technology described above for the preparation of polymer (I). For example, bis-carborane silanol-terminated carborane-siloxane oligomers may be prepared under mild conditions by the addition of bis-ureidosilanes (XXI) to a stoichiometric excess of carborane disilanol (XXII) in an inert organic solvent to produce bis-hydroxy-terminated carboranesiloxane oligomer (XXIII):

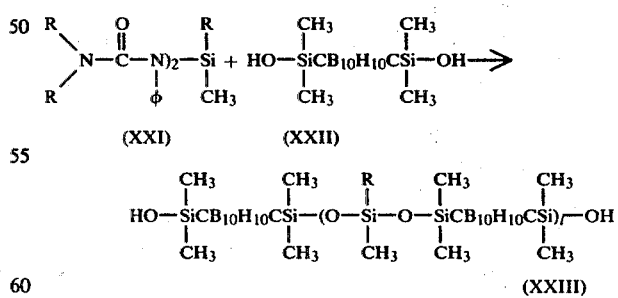

wherein R is any of the R groups described above, $\phi$ is phenyl and l is as previously indicated. Similarly, although less desirable, the reaction of bis-(hydroxydimethylsilyl)carborane (XXIV) with an excess of bis-N,-tetramethylene-N'-phenylureido)dimethylsilane (XXV) will produce the bis-ureidosilane-terminated carboranesiloxane oligomer (XXVI):

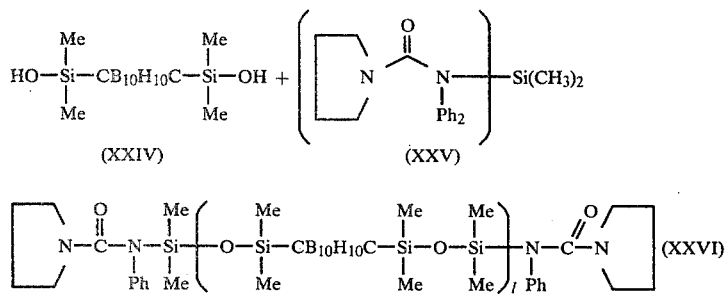

(XXIV) (XXV)

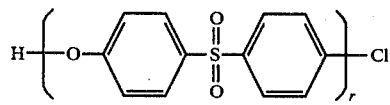

(XXVI)

where Me is methyl, Ph is phenyl and p is as previously indicated.

Other bis-reactive end group-terminated carborane-siloxane oligomers may be prepared by similar reactions wherein the reactant bearing the reactive end group is employed in excess, as is apparent to those skilled in the art.

The bis-reactive end group-terminated oligomer of the hard polymer may be prepared by reacting a pre-formed polymer with a compound affording the reactive end groups. For example, one mole of a bis-hydroxy-terminated polysulfone oligomer may be reacted in an inert organic solvent under mild conditions with two molar equivalents of methylphenyl-bis-ureidosilane to produce a bis-silyl urea-terminated polysulfone oligomer. Other, related, oligomers of suitable rigid polymers having bis-reactive end groups such as hydroxy and silanol may be prepared using similar techniques.

Since the preparation of the carborane-siloxane oligomer involves the use of known techniques which can produce a polymer having well-characterized qualities such as controlled molecular weight, and since the oligomer of the rigid polymers may be prepared starting from a pre-formed and well-characterized rigid polymer, the properties of the block copolymer of the invention, such as molecular weight, can be controlled and a well-characterized product results.

A presently preferred block copolymer $+A—B+_n$ of an elastomeric carborane-siloxane block and a rigid polysulfone block may be prepared by a preferred process which comprises stoichiometrically titrating a bis-carborane silanol-terminated carborane-siloxane oligomer with a previously prepared bis-silyl urea-terminated polysulfone to alternately couple the two polymers. This preferred process is advantageous since the bis-carborane silanol-terminated carborane-siloxane oligomer may be isolated and purified which permits the determination of the number average molecular weight for proper reaction stoichiometry and the determination of the amount of silanol end group termination. In addition, the preparation of the bis-silyl urea-terminated polysulfone from a well-characterized polysulfone oligomer can be accomplished at substantially 100% purity using available technology. Further, using the technology described above, an alternating block copolymer can be prepared that is also of high molecular weight.

The alternating block copolymer BAB of the invention may be prepared by a process similar to that described above for the block copolymers $+A—B+_n$, with the exception that the oligomer of the hard polymer has a single end-terminated reactive group. As a result, the single reactive group-terminated hard polymer oligomer is reacted with the bis-reactive group-terminated oligomer of the soft block to produce the block copolymer BAB. For example, 4-chlorophenyl-4'-hydroxyphenylsulfone may be homopolymerized to produce a hydroxy- and chloro-terminated polysulfone oligomer of the formula:

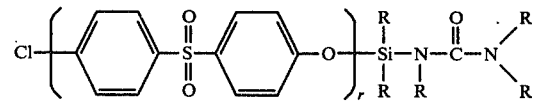

wherein r is as previously indicated. This monofunctional oligomer may then be reacted with a ureido silane to produce the monofunctional oligomer:

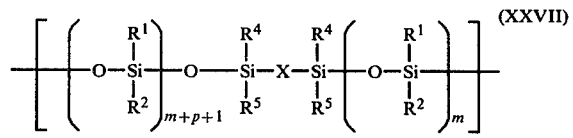

wherein R and r are as previously indicated. This oligomer may then be reacted with a bis-silanol end-terminated carborane-siloxane oligomer, as described above, to yield a block copolymer of the BAB type.

The Random Block Copolymer

The random block copolymers of the invention may be represented by the formula $+(A')_x—B+_n$ or $+A—(B')_y+_n$; wherein A, B and n are as previously described in connection with alternating block copolymers; A' represents a single repeating unit of a carborane-siloxane polymer of the formula (XXVII):

$$\left[\left(-O-\underset{R^2}{\overset{R^1}{\underset{|}{\overset{|}{Si}}}}-O\right)_{m+p+1}-\underset{R^5}{\overset{R^4}{\underset{|}{\overset{|}{Si}}}}-X-\underset{R^5}{\overset{R^4}{\underset{|}{\overset{|}{Si}}}}-\left(O-\underset{R^2}{\overset{R^1}{\underset{|}{\overset{|}{Si}}}}\right)_m\right] \quad \text{(XXVII)}$$

wherein $R^1$, $R^2$, $R^4$, $R^5$, X, m and p are as previously indicated; B' represents a single repeating unit of a suitable rigid polymer, such as those described hereinabove, for example, B' in the case of a polyarylether may be the repeating unit $+O—E—O—E'+$, wherein E and E' are as previously indicated; $(A')_x$ and $(B')_y$ represent respectively soft carborane-siloxane blocks prepared in situ in the presence of hard block B, and rigid polymer blocks prepared in situ in the presence of soft blocks A; x and y are positive numbers representing the degrees of polymerization of blocks (A') and (B'), which may vary in successive recurring units $\pm\ \pm_n$. In other words, in any given recurring unit $\pm(A')_x-B\pm_n$ or $\pm A-(B')_y\pm_n$, x and y may be different since the soft and hard blocks in the different recurring units may have different degrees of polymerization.

The random block copolymer ideally exhibits similar or better elastomeric properties than the alternating block copolymer described above, due in part to the fact that the random copolymers exhibit different rheological properties than the alternating copolymers. The random copolymers may contain varied amounts of the soft elastomeric carborane-siloxane polymer block depending on the desired properties and preferably contain a sufficient amount to render the copolymer elastomeric in nature and this amount may vary depending upon the desired properties. Preferably, the amount of the soft block is 50% to 85% by weight.

The molecular weight of the random copolymer may vary over a wide range and is not especially critical. Similar considerations apply with respect to the molecular weight of the random copolymers as explained above with respect to the alternating block copolymers. Preferably, the molecular weight (weight average) may vary from 2,000 to 200,000 and higher, most preferably at least 150,000. The molecular weights of the individual soft and hard blocks will depend on the total molecular weight and preferably, x may vary within a range of 5 to 50 and y within a range of 5 to 35. The molecular weight (weight average) of blocks A, B, $(A')_x$ and $(B')_y$ preferably ranges from 600 to 25,000. The process for random copolymers is more facilely conducted, and the chemistry is also less demanding in that the stoichiometry can be regulated in the monomer stage and reactive oligomers need not be prepared of both individual blocks.

Processes for Preparing the Random Copolymers

The random copolymers $\pm(A')_x-B\pm_n$ may be prepared by polymerizing the monomers comprising A' in the presence of a preformed end-reactive oligomer of polymer B to yield a random distribution of the two polymer blocks $(A')_x$ and B in the copolymer backbone. For example, a hydroxy-terminated polysulfone oligomer (XXIX) is silyl urea-terminated in the presence of a large excess of methylphenyl silyl bis-urea (XXX), followed by titration with carborane disilanol (XXXI) to yield random copolymer (XXXII):

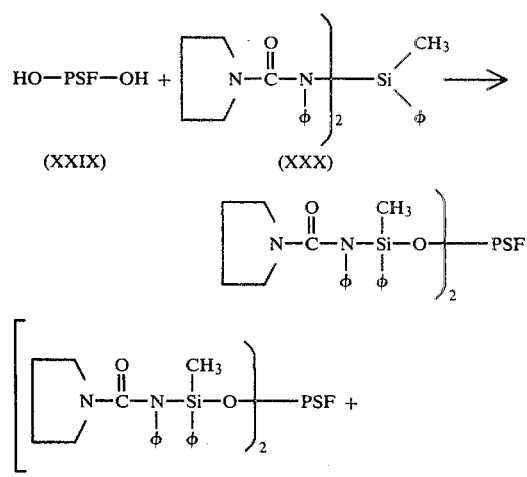

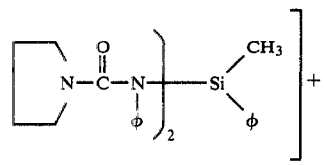

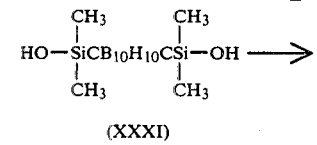

(XXXI)

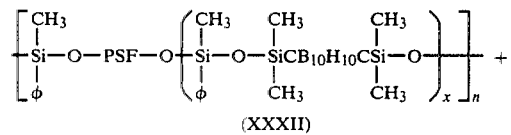

(XXXII)

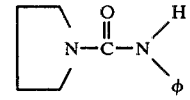

wherein PSF represents the polysulfone polymer backbone, φ is phenyl, and x and n are as previously indicated.

An alternative exemplary technique is to titrate a mixture of a hydroxy-terminated polysulfone (XXIX) and an excess of carborane disilanol (XXXI) with methylphenyl silyl bis-urea (XXX) to yield random copolymer (XXXIII):

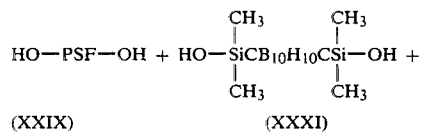

(XXIX)　　　　　(XXXI)

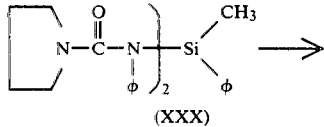

(XXX)

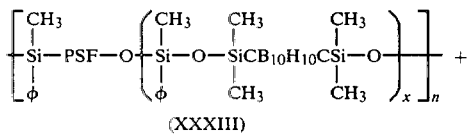

(XXXIII)

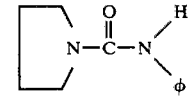

wherein PSF, φ, x and n are as previously indicated.

Similar random block copolymers $\pm(A')_x-B\pm_n$, containing related carborane-siloxane monomer units A', may be prepared by these or related techniques. In fact, the monomers that may be employed in such processes include the different types described hereinabove in conjunction with the preparation of polymer (I). The reaction conditions are generally mild in nature and are not critical. Generally, the random copolymers $\pm(A')_x-B\pm_n$ may be prepared under similar conditions as described above in connection with the preparation of polymer (I), and similarly, the random copolymers $\pm A-(B')_y\pm_n$ may be prepared under the conditions employed in conventional processes for preparing the rigid polymers described above.

The random copolymer $+A-(B')_y+_n$ of the invention may be prepared in a similar manner by polymerizing B' in the presence of a preformed oligomer of carborane-siloxane polymer soft block A to yield a random distribution of the two polymer blocks A and $(B')_y$ in the copolymer backbone. Since siloxane moieties are subject to attack by strong acids and bases, this will govern to an extent the selection of the in situ formed hard block $(B')_y$.

An advantage of the present invention is that block copolymers can be formed with many different hard blocks since the carborane-siloxane polymers forming the soft blocks have good high temperature properties. The use of prior art soft blocks, such as the silicones, precluded the use of many of the high use temperature hard blocks described herein, e.g., polyimides, because the processing temperatures associated with such prior art hard blocks led to melt degradation of the prior art soft blocks.

EXAMPLE 1

The Preparation of Bis-Carborane Silanol-Terminated Carborane-Siloxane Oligomers 28.31 grams (0.09677 mole) of carborane disilanol $HO-Si(CH_3)_2CB_{10}H_{10}CSi(CH_3)_2OH$ was weighed under nitrogen into a 250 ml, three neck, flask fitted with a mechanical stirrer and a nitrogen inlet. Into a separate 100 ml flask under nitrogen was weighed 14.26 grams (0.02859 mole) of methylphenylsilyl bis-urea

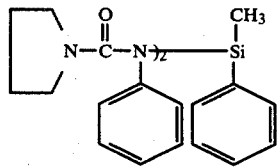

and 25.12 grams (0.05753 mole) of dimethyl silyl bis-urea

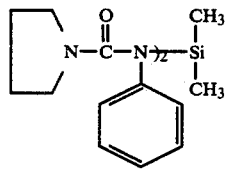

The flask containing the mixed silyl bis-urea monomers was attached to the flask containing the carborane disilanol with a solids addition tube and the reaction assembly was placed under an inert blanket of nitrogen. The carborane disilanol was diluted with 28 mls of dry chlorobenzene and mechanical stirring was commenced.

The carborane disilanol/chlorobenzene slurry was cooled to $-15°$ to $-25°$ C. and the mixed silyl bis-ureas were added portionwise to the reaction via the solids additions tube over 3 hours. After 2 hours of addition of the mixed silyl bis-ureas, the reaction mixture began to thicken indicating an increase of molecular weight of polymer. At the conclusion of the addition, one ml of dry chlorobenzene was employed to wash the remaining silyl bis-ureas from the flask walls into the reaction mass. The reaction was cooled for 1.5 hours at $-15°$ to $-25°$ C. and then allowed to warm up to room temperature. Mechanical stirring was maintained at a slow speed overnight.

The carborane-siloxane oligomer reaction mass was diluted with chlorobenzene to obtain a pourable consistency and then vacuum filtered to remove a major portion of the urea byproduct. The carborane-siloxane oligomer solution was then precipitated three times from methanol to remove low molecular weight species. The oligomer was subsequently dried at $80°-100°$ C., 10 $\mu$Hg, overnight to remove the residual chlorobenzene and methanol.

The recovered yield of carborane-siloxane oligomer was 27.2 grams. The reduced viscosity was 0.53 dL/gram in chloroform at 25° C. The molecular weight of the carborane-siloxane oligomer by gel-permeation chromatography (G.P.C.) was 161,294 for the weight average molecular weight ($\overline{M}_w$) and 45,561 for the number average molecular weight ($\overline{M}_n$). Active hydrogen analysis of the carborane silanol-terminated carborane-siloxane oligomer for -OH groups was 750±30 ppm which upon calculation yields a number average molecular weight ($\overline{M}_n$) of 45,310±1820. Using the number average molecular weight data, the number of repeat units was calculated to be 122.

EXAMPLE 2

Preparation of Bis-Hydroxy Terminated Polysulfone Oligomer

Into a 1 liter, 4 neck flask fitted with a mechanical stirrer, Barret trap, thermometer, nitrogen inlet, and addition funnel are added 0.50 mole of bisphenol A (114.14 grams), 208 ml of dimethylsulfoxide, and 416 ml of chlorobenzene. After purging 30 minutes with nitrogen, the temperature is increased to 50° C. and 1.0 mole of sodium hydroxide (50% aqueous solution) is added. The reaction is dehydrated by removal of chlorobenzene. After complete water removal, the temperature is increased to 155° C. The reaction is cooled slightly and 0.46 mole of dichlorodiphenylsulfone (132.7 grams) dissolved in 135 ml of hot chlorobenzene is added. The reaction is heated to 160°-165° C. for 1.75 hours. The reaction is then cooled to below 90° C. and 11 grams of oxalic acid added. After filtration, the oligomer was isolated by coagulation in methanol (oxalic acid acidified), treated with boiling water, and dried in a vacuum oven at 125° C. at 50 mm.

End group analysis for —OH indicated a $\overline{M}_n$ of 5876 which would upon calculation indicate 12.8 repeating units.

EXAMPLE 3

The Preparation of a Carborane-Siloxane/Polysulfone Alternating Block Copolymer

To a 100 ml, 1 neck, reaction flask was added 2.078 grams (0.0000456 mole) of the carborane silanol-terminated carborane-siloxane oligomer prepared in Example 1, and a small magnetic stirring bar. The reaction flask was placed in a vacuum oven at 100° C. and pumped at 30 $\mu$Hg overnight to dry the oligomer. The reaction flask was septum sealed under nitrogen and diluted with 7.0 mls of dry chlorobenzene to dissolve the oligomer. The reaction flask was placed under positive nitrogen and magnetically stirred at 25° C.

The carborane silanol-terminated carborane-siloxane oligomer/chlorobenzene solution was titrated and coupled at 25° C. with a dilute chlorobenzene solution of methylphenyl silyl urea-terminated polysulfone oligomer (produced as shown below). The titration was continued for 2.5 hours until such time as the block copolymer solution in the reaction flask became extremely viscous. Dry chlorobenzene was added to the block copolymer mass to dilute the block copolymer and stirring was continued overnight. The block copolymer solution was further diluted with about 150 mls of chlorobenzene and then precipitated from methanol. The block copolymer was vacuum dried at 100° C., 50 μHg, overnight to remove low molecular weight solvent species. The resulting carborane-siloxane/polysulfone alternating block copolymer containing 11.9 weight percent polysulfone was recovered in 2.21 gram yield and it exhibited a reduced viscosity of 3.65 dL/gram in chloroform at 25° C. and a weight average molecular weight was estimated at at least 5,000,000.

The methylphenyl silyl urea-terminated polysulfone oligomer/chlorobenzene solution used to titrate and couple the carborane silanol-terminated carborane-siloxane was prepared in the following manner. 2.664 grams (0.000442 mole) of a bisphenol-A terminated polysulfone oligomer ($\overline{M}_n = 6020$) prepared as in Example 2 was weighed into a 50 ml, 3 neck, flask fitted with a Dean-Starke trap and condensor and a nitrogen inlet. The polysulfone oligomer was diluted with about 20 mls of chlorobenzene to dissolve the polysulfone oligomer. The polysulfone solution was azeotropically distilled at 170° C. under nitrogen to remove the last traces of water. The polysulfone solution (about 5 mls) was cooled to 25° C. under nitrogen prior to further use.

The dried polysulfone/chlorobenzene solution was taken up in a 5 ml hypodermic syringe and titrated into a septum sealed 50 ml, 1 neck, flask containing a magnetically stirred slurry of 0.4415 gram (0.0008853 mole) of methylphenyl silyl bis-urea and 3.0 mls of dry chlorobenzene. The titration was conducted at $-10° \pm 5°$ C. for 2–3 hours to methylphenyl silyl urea-terminate the polysulfone oligomer in nearly 100 percent purity. This solution was then allowed to warm to 25° C. and then a portion of the solution was taken up in a hypodermic syringe and used to titrate the carborane-siloxane solution.

EXAMPLE 4

A portion of the block copolymer produced in Example 3 was film cast from methylene chloride and vacuum dried at 50° C. overnight. The mechanical properties of several samples of the cast block copolymer were measured at various temperatures after storage and the results are shown in Table I below:

TABLE I

| Test Temp (°C.) | Young's Modulus (psi) | Tensile Strength (psi) | Elongation at break (%) | Yield Strength (psi) | Yield Elongation (%) |
|---|---|---|---|---|---|
| Storage Time of 14 days at 25° C. | | | | | |
| −25 | 2070 | 662 | 210 | 111 | 6 |
| 0 | 795 | 277 | 200 | 30 | 14 |
| 25 | 352 | 137 | 200 | 35 | 25 |
| 50 | 70 | 167 | 320 | NONE | NONE |
| 100 | 70 | 137 | 400 | NONE | NONE |
| 150 | 70 | 24 | 240 | NONE | NONE |
| 200 | 35 | 12 | 75 | NONE | NONE |
| Storage Time of 3 days at 25° C. | | | | | |
| 30 | 95 | 438 | 450 | NONE | NONE |

EXAMPLE 5

The thermal stability of the block copolymer produced in Example 3 was determined by thermogravimetric Analysis up to 800° C. The polymer stability was determined, both in air and nitrogen, by measuring the weight loss, or gain, as a function of temperature. The results are shown in FIG. 1. The block copolymer has an onset of weight loss at about 400° C. which indicates good thermal stability. In air, the block copolymer has a weight loss of about 12 weight percent at 500° C. which corresponds to the relative amount (i.e., 11.9%) of hard block in the copolymer. In nitrogen, only a 30 percent weight loss is exhibited up to 800° C.

The thermostability of the same block copolymer in air and nitrogen is compared with a carborane-siloxane polymer produced by polymerizing the oligomer of Example 1, having a weight-average molecular weight of at least $5 \times 10^6$, and a commercially available bisphenol A/dichlorodimethylsulfone polysulfone available from Union Carbide Corp. under the Trademark P-1700. The results are shown in FIGS. 2 and 3. In air, the block copolymer is not as thermally stable as the high molecular weight carborane-siloxane polymer which is oxidatively crosslinked. The block copolymer has a slightly lower thermal stability in air than the commercial grade polysulfone which may be due to the shorter oligomer polysulfone blocks in the block copolymer, or more likely due to the presence of oxidatively generated free radicals on the carborane-siloxane block. In nitrogen, the block copolymer has an onset of weight loss comparable to the carborane-siloxane polymer and polysulfone. This weight loss approaches 30 percent for the block copolymer and 70 percent for polysulfone at 800° C.

EXAMPLE 6

A carborane-siloxane/polysulfone random block copolymer was prepared by the incorporation of polysulfone into the reaction described in Example 1 during the preparation of the carborane-siloxane oligomer.

To the reaction vessel which contains 6.32 grams (0.02160 mole) of carborane disilanol in 2.0 mls of dry chlorobenzene at 0° C., 3.40 grams (0.00682 mole) of methylphenyl silyl bis- urea and 5.98 grams (0.01369 mole) of dimethyl silyl bis-urea were added portionwise as a solid over 4.0 hours. Simultaneously with this addition of mixed silyl bis-ureas, 1.4 grams (0.00023 mole) of the azeotropically dried, hydroxy-terminated, polysulfone oligomer described in Example 3 in 5 mls of chlorobenzene was titrated into the reaction to form a random block copolymer. The reaction was subsequently titrated over 10 hours with 6 mls of a dry chlorobenzene solution containing 1.20 grams (0.00240 mole) of methylphenyl silyl bis-urea to adjust the stoichiometry of the reaction.

The random block copolymer was purified by two precipitations from methanol and vacuum dried at 100° C., 30 μHg, overnight to remove residual solvent.

The random block copolymer exhibited a residual viscosity of 0.50 dL/gram in methylene chloride at 25° C. G.P.C. analysis showed the random block copolymer to have a weight average molecular weight of 147,736 and a number average molecular weight of 20,858. The block copolymer exhibited the following mechanical properties Young's Modulus=3,200 psi
Tensile Strength=110 psi Elong. at Break=40%

EXAMPLE 7

Preparation of a Carborane-Siloxane/Polysulfone Random Block Copolymer

A random block copolymer of carborane-siloxane and polysulfone was prepared by the modification of the procedure used to prepare carborane-siloxane oligomer in Example 1.

To a reaction flask containing a slurry of 6.57 grams (0.02246 mole) of carborane disilanol in 6.5 mls of dry chlorobenzene at 0° C. was added a chlorobenzene solution of 3.90 grams (0.00782 mole) of methylphenyl silyl bis-urea and 6.91 grams (0.01582 mole) of dimethyl silyl bis-urea; and a chlorobenzene solution of 1.4 grams (0.00023 mole) of the azeotropically dried, hydroxy-terminated polysulfone oligomer described in Example 3. The mixed silyl bis-urea solution and the polysulfone oligomer solution were simultaneously titrated into the carborane disilanol slurry over a 3.5–4.0 hour period. The reaction product was subsequently titrated with a chlorobenzene solution of 0.53 gram (0.00106 mole) of methylphenyl silyl bis-urea over 3.0 hours to adjust the stoichiometry of the reaction.

The random block copolymer was recovered by precipitation twice from methanol and vacuum dried at 100° C., 50 µHg, overnight to remove the residual solvent species. The random block copolymer exhibited a reduced viscosity of 0.32 dL/gram in methylene chloride at 25° C.

What is claimed is:

1. An elastomeric alternating block copolymer comprising alternating soft blocks of a carborane-siloxane polymer and hard blocks of a rigid thermoplastic polymer, wherein said carborane-siloxane polymer block has a repeating unit represented by the formula:

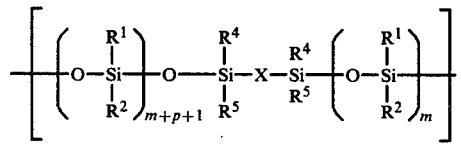

wherein $R^1$ and $R^2$, which may be the same or different, each represents hydrogen or a group containing up to 14 carbon atoms and selected from the group consisting of alkyl, alkenyl, cycloalkyl, aryl, alkaryl, aralkyl, alkoxyaryl, haloalkyl, haloaryl, cyanoalkyl, and pyridinyl; $R^4$ and $R^5$, which may be the same or different, each represents hydrogen or a group containing up to 14 carbon atoms and selected from the group consisting of alkyl, alkenyl, aryl, alkaryl, alkoxy, alkoxyalkyl, haloalkyl, haloaryl and cyanoalkyl; X represents a divalent radical derived from a carborane selected from the group consisting of 1,7-decacarborane, 1,12-decacarborane, 1,10-octacarborane, 1,6-octacarborane, 2,4-pentacarborane, 1,6-tetracarborane, 9-alkyl-1,7-decacarborane, 9,10-dialkyl-1,7-decacarborane, 2-alkyl-1,12-decacarborane, 2-alkyl-1,10-octacarborane, 8-alkyl-1,6-octacarborane, decachloro-1,7-decacarborane, decachloro-1,12-decacarborane, octachloro-1,10-octacarborane, decafluoro-1,7-decacarborane, decafluoro-1,12-decacarborane, octafluoro-1,10-octacarborane, and mixtures thereof; and m and p individually are integers which have a value of from 0 to 4 and wherein said rigid thermoplastic polymer is selected from the group consisting of polysulfones, polyimides, polycarbonates, aromatic and alkyl polyesters, polyphenylene sulfides, polyquinoxalenes and polybenzimidizoles.

2. The block copolymer of claim 1 wherein said rigid thermoplastic polymer, in high polymer form has a Young's modulus above 200,000 psi, a phase transition temperature above 150° C., and a tensile strength of at least 5,000 psi.

3. The block copolymer of claim 1, which has a weight average molecular weight of from 25,000 to 20,000,000.

4. The block copolymer of claim 1, wherein the carborane-siloxane polymer has a weight average molecular weight of from 5,000 to 40,000 and wherein the number average molecular weight of said rigid thermoplastic polymer is from 2,000 to 10,000.

5. The block copolymer of claim 1, wherein X is a decacarbonaryl group.

6. The block copolymer of claim 1, wherein m and p are zero.

7. The block copolymer of claim 6, wherein at least one of said $R^1$ and $R^2$ and at least one of said $R^4$ and $R^5$ is alkyl.

8. The block copolymer of claim 1, which has a recurring unit represented by ‑(‑A—B‑)‑, wherein A represents said carborane-siloxane polymer and wherein B represents said rigid thermoplastic polymer.

9. The block copolymer of claim 1, which has a structure represented by BAB, wherein A represents said carborane-siloxane polymer and B represents said rigid thermoplastic polymer.

10. A method for preparing the block copolymers of claim 1 which comprises reacting a reactive end group-terminated oligomer of said carborane-siloxane polymer with a corresponding reactive end group-terminated oligomer of said rigid thermoplastic polymer to couple said oligomers and form the block copolymer.

11. The method of claim 10, wherein said reactive end groups are hydroxy-containing groups or reactive derivatives.

12. The method of claim 11, wherein said reactive end groups are selected from the group consisting of phenolic, silanol, ether, ester, siloxane and silyl ester reactive end groups.

13. The method of claim 10, wherein said carborane-siloxane oligomer is carborane silanol-terminated.

14. The method of claim 10, wherein said rigid thermoplastic polymer oligomer is silyl-urea terminated.

15. The method of claim 10, wherein said reaction is conducted in an inert solvent.

16. The method of claim 10, wherein said carborane-siloxane oligomer is bis-carborane silanol-terminated and wherein said oligomer of said rigid thermoplastic polymer is a bis-ureidosilane-terminated polysulfone.

17. The method of claim 10, wherein said carborane-siloxane oligomer is bis-carborane silanol-terminated and wherein said oligomer of said rigid thermoplastic polymer is a mono-ureidosilane-terminated polysulfone.

18. An elastomeric random block copolymer having a repeating unit represented by ‑(‑(A¹)ₓ—B‑)‑ or ‑(‑A—(B¹)ᵧ‑)‑; wherein A¹ represents a single carborane-siloxane unit of the formula (I)

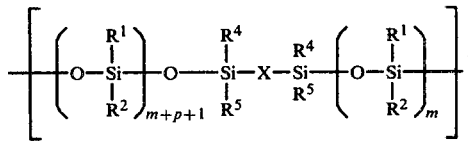

wherein $R^1$ and $R^2$, which may be the same or different, each represents hydrogen or a group containing up to 14 carbon atoms and selected from the group consisting of alkyl, alkenyl, cycloalkyl, aryl alkaryl, aralkyl, alkoxyaryl, haloalkyl, haloaryl, cyanoalkyl, and pyridinyl; $R^4$ and $R^5$, which may be the same or different, each represents hydrogen or a group containing up to 14 carbon atoms and selected from the group consisting of alkyl, alkenyl, aryl, alkaryl, alkoxy, alkoxyalkyl, haloalkyl, haloaryl and cyanoalkyl; X represents a divalent radical derived from a carborane selected from the group consisting of 1,7-decacarborane, 1,12-decacarborane, 1,10-octacarborane, 1,6-octacarborane, 2,4-pentacarborane, 1,6-tetracarborane, 9-alkyl-1,7-decacarborane, 9,10-dialkyl-1,7-decacarborane, 2-alkyl-1,12-decacarborane, 2-alkyl-1,10-octacarborane, 8-alkyl-1,6-octacarborane, decachloro-1,7-decacarborane, decachloro-1,12-decacarborane, octachloro-1,10-octacarborane, decafluoro-1,7-decacarborane, decafluoro-1,12-decacarborane, octafluoro-1,10-octacarborane, and mixtures thereof; and m and p individually are integers which have a value of from 0 to 4, $B^1$ represents a single repeating unit of a rigid thermoplastic polymer; A represents a carborane-siloxane polymer produced by polymerizing the repeating unit of formula (I); B represents a rigid thermoplastic polymer; x and y are positive numbers representing the degrees of polymerization of said $A^1$ and $B^1$, respectively and wherein said rigid thermoplastic polymer is selected from the group consisting of polysulfones, polyimides, polycarbonates, aromatic and alkyl polyesters, polyphenylene sulfides, polyquinoxalenes and polybenzimidizoles.

19. The block copolymer of claim 18 which has a weight average molecular weight of from 2,000 to 200,000.

20. The block copolymer of claim 18, wherein x is from 5 to 50 and y is from 5 to 35.

21. The block copolymer of claim 18, wherein the weight average molecular weight of said A, B, $(A^1)_x$ and $(B^1)_y$ is from 600 to 25,000.

22. The block copolymer of claim 18, wherein said rigid thermoplastic polymer has a Young's modulus above 200,000 psi, a phase transition temperature above 150° C., an elongation at break of less than 150% and a tensile strength of at least 5,000 psi.

23. The block copolymer of claim 18, wherein X is a decacarboranyl group.

24. The block copolymer of claim 18, wherein m and p are zero.

25. The block copolymer of claim 24, wherein at least one of said $R^1$ and $R^2$ and at least one of said $R^4$ and $R^5$ is alkyl.

26. A method for preparing the random block copolymers $[(A^1)-B]$ of claim 18, which comprises polymerizing at a temperature of from about 10° to about 35° C., a monomer comprising said $A^1$ in the presence of a reactive end group-terminated oligomer of said rigid thermoplastic polymer B.

27. The method of claim 26, comprising polymerizing carborane disilanol in the presence of a bis-silyl urea-terminated polysulfone oligomer.

28. A method for preparing the random block copolymers $[A-(B^1)Y]$ of claim 18, which comprises polymerizing at a temperature of from about 10° to about 35° C., a monomer comprising said $B^1$ in the presence of reactive end group-terminated carborane-siloxane oligomer.

* * * * *